(12) United States Patent
Kuhn

(10) Patent No.: US 7,808,387 B1
(45) Date of Patent: Oct. 5, 2010

(54) VOLTAGE REFERENCE CIRCUIT WITH LOW-POWER BANDGAP

(75) Inventor: Jay A. Kuhn, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 309 days.

(21) Appl. No.: 12/108,311

(22) Filed: Apr. 23, 2008

Related U.S. Application Data

(60) Provisional application No. 60/933,627, filed on Jun. 7, 2007.

(51) Int. Cl.
*G08B 13/14* (2006.01)
(52) U.S. Cl. ............... 340/572.1; 323/308; 365/185.05
(58) Field of Classification Search ............. 340/572.1, 340/572.5; 257/E21.112, E27.112, E29.273, 257/E29.3, E43.003, 57, 255; 323/308; 365/185.05, 365/185.1, 185.18, 185.28; 438/163, 217, 438/289
See application file for complete search history.

(56) References Cited

U.S. PATENT DOCUMENTS

| | | | | |
|---|---|---|---|---|
| 4,700,211 A | * | 10/1987 | Popovic et al. ............. | 257/423 |
| 4,742,296 A | * | 5/1988 | Petr et al. ................... | 324/142 |
| 5,694,032 A | * | 12/1997 | Gersbach et al. ............ | 323/315 |
| 7,504,327 B2 | * | 3/2009 | Yamazaki et al. ........... | 438/525 |
| 7,652,921 B2 | * | 1/2010 | Horch et al. ............. | 365/185.1 |
| 2008/0203501 A1 | * | 8/2008 | Yamazaki et al. ........... | 257/413 |
| 2008/0237595 A1 | * | 10/2008 | Park et al. ..................... | 257/57 |
| 2009/0078970 A1 | * | 3/2009 | Yamazaki et al. ........... | 257/255 |
| 2009/0238008 A1 | * | 9/2009 | Horch ................... | 365/185.28 |

* cited by examiner

*Primary Examiner*—John A Tweel, Jr.
(74) *Attorney, Agent, or Firm*—Turk IP Law, LLC

(57) ABSTRACT

The present disclosure provides for a voltage reference circuit for Radio Frequency Identification (RFID) tag circuit. Such a circuit is formed in a substrate that is lightly doped with impurities of a first polarity. A first transistor having a first source connected to a ground, a first gate doped with impurities of the first polarity, and a first drain connected to the first gate at a reference node, a reference current source to provide a reference current to the reference node for generating a first reference voltage at the reference node, and an additional component for receiving the first reference voltage are disclosed.

33 Claims, 9 Drawing Sheets

RFID TAG COMPONENTS

VOLTAGE REFERENCE AS PART
OF POWER MANAGEMENT UNIT

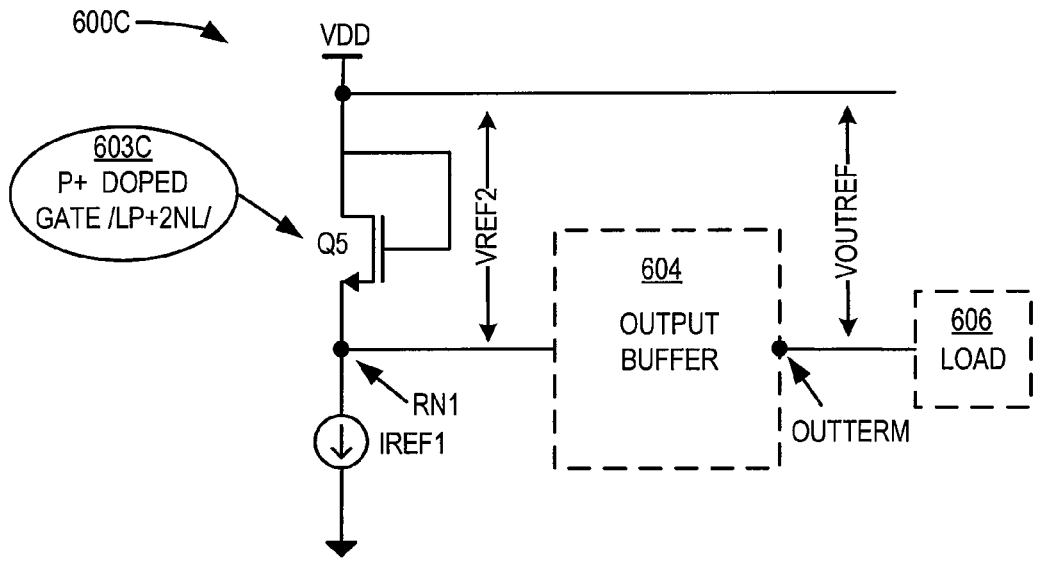
FIG. 6C  *LOW-POWER BANDGAP REFERENCE WITH NATIVE NMOS*
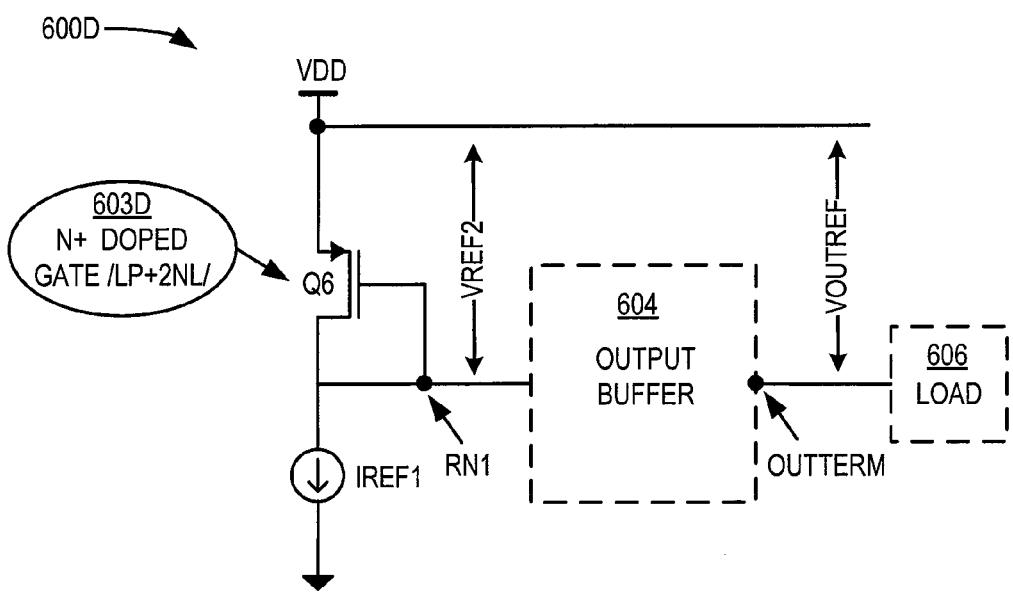
FIG. 6D  *LOW-POWER BANDGAP REFERENCE WITH NATIVE PMOS*

LOW POWER BAND GAP REFERENCE

LOW-POWER BANDGAP REFERENCE WITH REFERENCE CURRENT SOURCE.

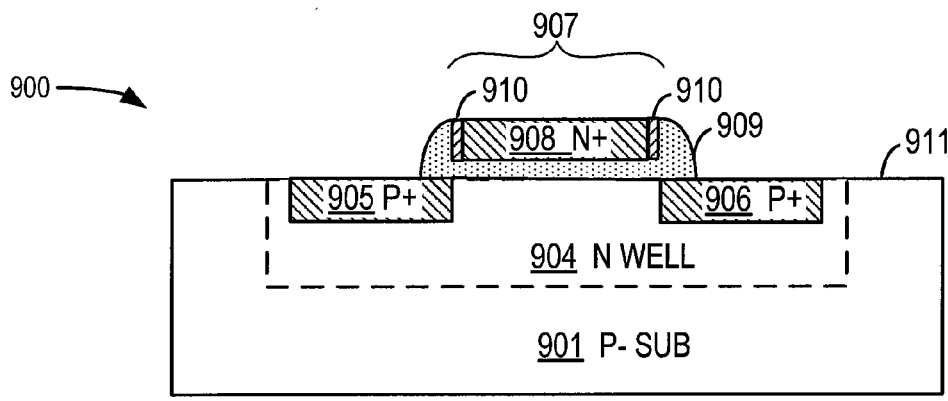
FIG. 9 (PRIOR ART)    PMOS TRANSISTOR WITH N+ DOPED GATE
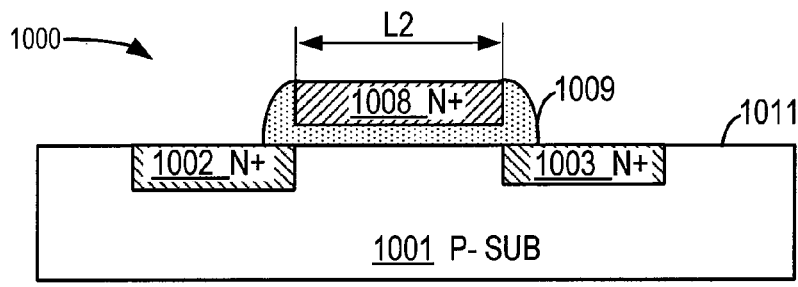
FIG. 10    NATIVE NMOS TRANSISTOR WITH N+ DOPED GATE
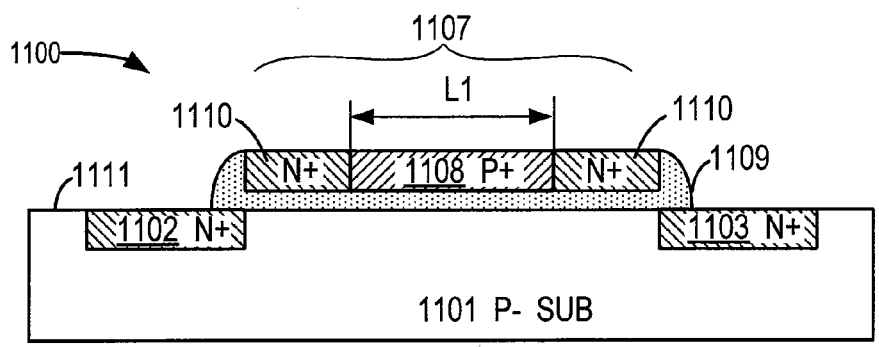
FIG. 11    NATIVE NMOS TRANSISTOR WITH P+ DOPED GATE AND N+ DOPED GATE GUARD REGION COMPARISON OF SIMULATED BEHAVIOR BANDGAP
REFERENCE WITH REGULAR NATIVE NMOS AND
NATIVE NMOS WITH P+ DOPED GATE

US 7,808,387 B1

VOLTAGE REFERENCE CIRCUIT WITH LOW-POWER BANDGAP

CROSS-REFERENCE TO RELATED APPLICATION

This patent application claims priority from U.S. Provisional Patent Application Ser. No. 60/933,627 filed on Jun. 7, 2007, the disclosure of which is hereby incorporated by reference for all purposes.

TECHNICAL FIELD

The present disclosure addresses the field of Radio Frequency IDentification (RFID) systems, and more specifically RFID tags having one or more voltage reference circuits in their power management unit.

BACKGROUND OF THE INVENTION

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

Harvesting sufficient power from the RF wave can be difficult since the voltage of the RF signal is in the range of approximately 200 mV, and a typical supply voltage for circuits of the RFID tag is one volt. Additionally, for relatively high-voltage operations such as programming and erasing non-volatile memory in the RFID tag, a boosted voltage, as high as 12 volts, may be needed. Complicating matters is that the RF wave received by the RFID tag is not provided continuously, and transmission by the RFID reader can be ceased without any prior notice.

SUMMARY OF THE INVENTION

The invention improves over the prior art. The disclosure presents a voltage reference circuit for Radio Frequency IDentification (RFID) tag circuit. Such a circuit is formed in a substrate that is lightly doped with impurities of a first polarity. A first transistor having a first source connected to a ground, a first gate doped with impurities of the first polarity, and a first drain connected to the first gate at a reference node, a reference current source to provide a reference current to the reference node for generating a first reference voltage at the reference node, and an additional component for receiving the first reference voltage are disclosed.

The invention offers the advantage of using a voltage reference circuit that allows working with a lower supply voltage and nano-ampere current levels. The circuit provides accurate reference voltage without the use of resistors or bipolar devices. In some embodiments, an output current value may be substantially higher than was available with prior art.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 6C is a circuit diagram showing a low-power bandgap reference circuit with native NMOS transistor with reference to a VDD supply according to an embodiment.

FIG. 6D is a circuit diagram showing a low-power bandgap reference circuit with native PMOS transistor with reference to a VDD supply according to an embodiment.

FIG. 9 shows an elevational cross-section of a PMOS transistor Q1 of FIG. 5 with an N+ doped gate according to prior art.

FIG. 10 shows an exemplary elevational cross-section of a native NMOS transistor Q7 of FIGS. 7 and 8.

FIG. 11 shows an exemplary elevational cross-section of a native NMOS transistor Q5 with P+ doped gate of FIGS. 6A, 6C, 7, and 8.

DETAILED DESCRIPTION OF PREFERRED EMBODIMENTS

Figure 1:
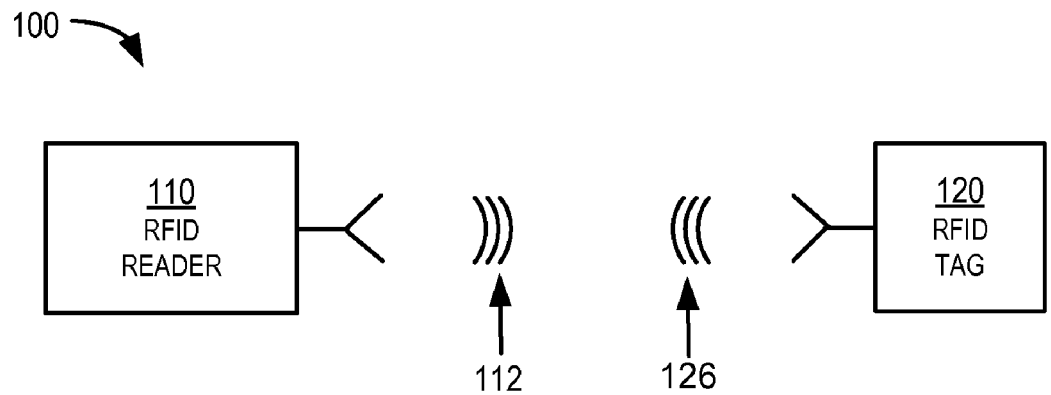
FIG. 1 is a block diagram of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

As it has been mentioned, the present invention provides a Voltage reference circuit using a low-power bandgap device. The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
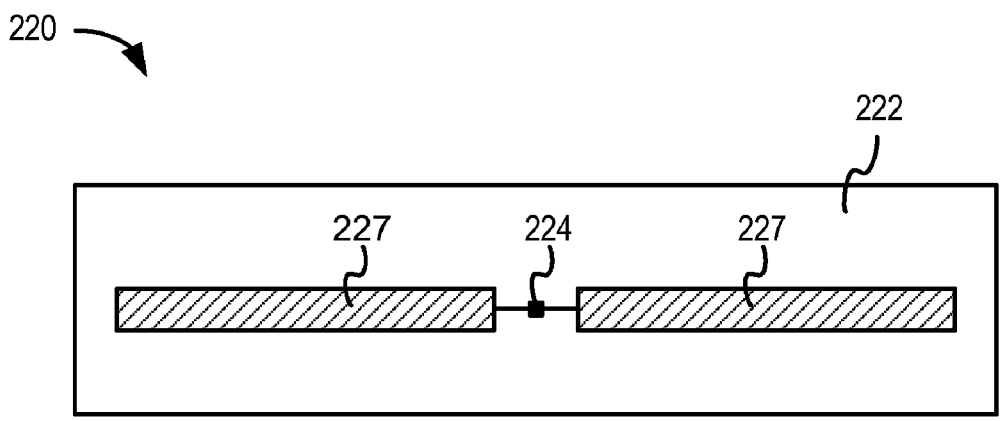
FIG. 2 is a diagram showing components of a passive RFID tag.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

Figure 3:
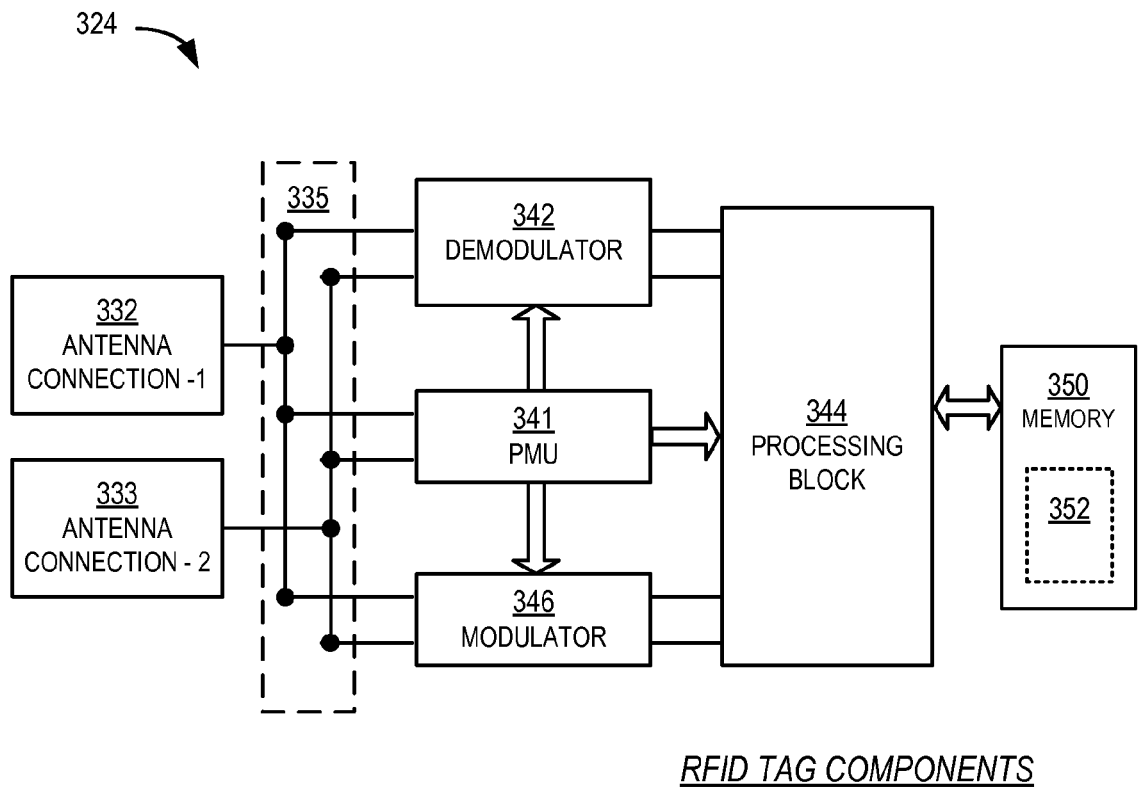
FIG. 3 is a block diagram of an implementation of an electrical circuit formed in an IC of the tag of FIG. 2.

FIG. 3 is a block diagram of an electrical circuit 324. Circuit 324 may be formed in an IC of an RFID tag, such as IC 224 of FIG. 2. Circuit 324 has a number of main components that are described in this document. Circuit 324 may have a number of additional components from what is shown and described, or different components, depending on the exact implementation.

Circuit 324 includes at least two antenna connections 332, 333, which are suitable for coupling to one or more antenna segments (not shown in FIG. 3). Antenna connections 332, 333 may be made in any suitable way, such as using pads and so on. In a number of embodiments, more than two antenna connections are used, especially in embodiments where more antenna segments are used.

Circuit 324 includes a section 335. Section 335 may be implemented as shown, for example as a group of nodes for proper routing of signals. In some embodiments, section 335 may be implemented otherwise, for example to include a receive/transmit switch that can route a signal, and so on.

Circuit 324 also includes a Power Management Unit (PMU) 341. PMU 341 may be implemented in any way known in the art, for harvesting raw RF power received via antenna connections 332, 333. In some embodiments, PMU 341 includes at least one rectifier, and at least one voltage reference.

In operation, an RF wave received via antenna connections 332, 333 is received by PMU 341, which in turn generates power for components of circuit 324. This is true for either or both R→T and T→R sessions, whether or not the received RF wave is modulated.

Circuit 324 additionally includes a demodulator 342. Demodulator 342 demodulates an RF signal received via antenna connections 332, 333. Demodulator 342 may be implemented in any way known in the art, for example including an attenuator stage, an amplifier stage, and so on.

Circuit 324 further includes a processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, memory, a decoder, an encoder, and so on.

Circuit 324 additionally includes a modulator 346. Modulator 346 modulates an output signal generated by processing block 344. The modulated signal is transmitted by driving antenna connections 332, 333, and therefore driving the load presented by the coupled antenna segment or segments. Modulator 346 may be implemented in any way known in the art, for example including a driver stage, amplifier stage, and so on.

In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Circuit 324 additionally includes a memory 350, which stores data 352. Memory 350 is preferably implemented as a Nonvolatile Memory (NVM), which means that data 352 is retained even when circuit 324 does not have power, as is frequently the case for a passive RFID tag.

It will be recognized at this juncture that the shown components of circuit 324 can be those of a circuit of an RFID reader according to the invention, with or without needing PMU 341. Indeed, an RFID reader can be powered differently, such as from a wall outlet, a battery, and so on. Additionally, when circuit 324 is configured as a reader, processing block 344 may have additional Inputs/Outputs (I/O) to a terminal, network, or other such devices or connections.

In terms of processing a signal, circuit 324 operates differently during a R→T session and a T→R session. The different operations are described below, in this case with circuit 324 representing an RFID tag.

Figure 4:
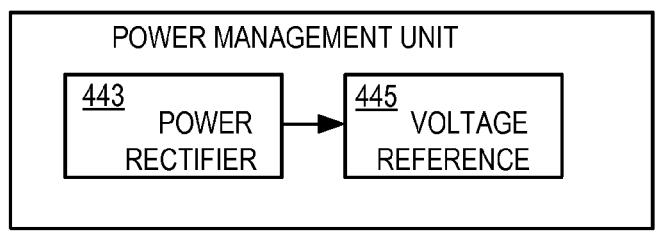
FIG. 4 is a block diagram illustrating a voltage reference component of a Power Management Unit of the circuit of FIG. 3 according to embodiments.

FIG. 4 is a block diagram of Power Management Unit 341 of FIG. 3. Power Management Unit 341 includes at least one power rectifier 443 and at least one voltage reference circuit 445.

Rectifier 443 is coupled to a terminal of an antenna (not shown) at input node 445 to receive phase RF- of an RF signal, and is also coupled to another terminal of the antenna (not shown) to receive a phase RF signal detected by the antenna. Rectifier 443 converts induced alternating current ("AC") voltage captured by the antenna segments into usable DC voltage. The DC voltage can be used to power the operations of RFID tag 220.

Voltage reference circuit 445 provides a low voltage, essentially temperature independent, reference voltage level. Structure and operation of voltage reference circuit 445 will be explained in more detail below.

Figure 5:
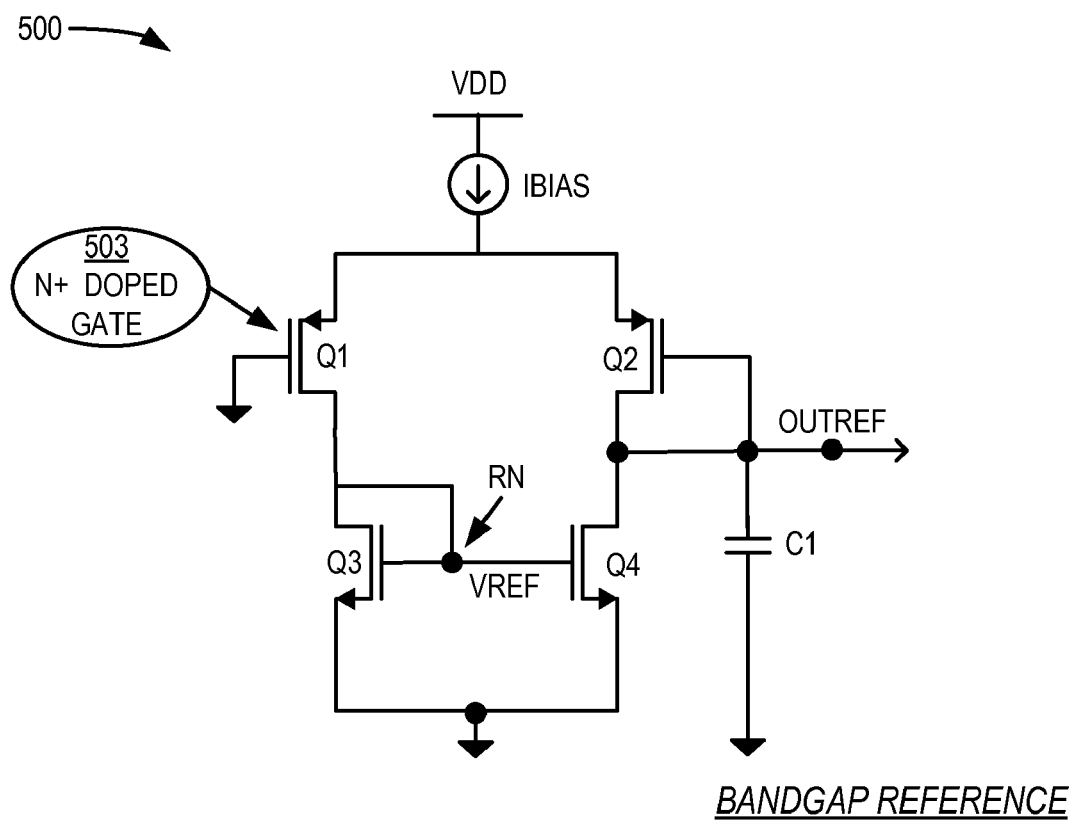
FIG. 5 is a circuit diagram showing a bandgap reference circuit according to prior art.

FIG. 5 is a circuit diagram of a prior art CMOS band gap voltage reference circuit 500. Reference circuit 500 is a traditional differential amplifier, it has a closed loop gain of one. One half of the differential amplifier is configured from PMOS transistor Q1 with a N+ doped poly silicon gate, as shown in note 503, and NMOS transistor Q3, while the other half is configured from PMOS transistor Q2 with NMOS transistor Q4. The N+ doping of Q1 changes a threshold of Q1 by the difference in the work function of P+ poly silicon and N+ poly silicon. This is approximately a silicon band gap. Sources of PMOS transistor Q1 and PMOS transistor Q2 are coupled to power source VDD via current source IBIAS. Current source IBIAS provides approximately 40 nA. The gate of Q1 is connected to ground. NMOS transistor Q3 is configured as a diode having its drain and gate shorted together to form node RN. Node RN is connected to the drain of PMOS transistor Q1. A source of NMOS transistor Q3 is connected to ground. A source of NMOS transistor Q4 is connected to ground, and its gate is connected to reference node RN to receive reference voltage VREF. A gate and drain of PMOS transistor Q2 are connected together to form an output node for the reference circuit. The drain of PMOS transistor Q2 is connected to the drain of NMOS transistor Q4. Capacitor C1 is connected between ground and the output node to provide filtering. Reference circuit 500 provides output voltage OUTREF at the output node.

The above described circuit suffers from a number of drawbacks. It requires relatively high power supply voltage, VDD needs to be 1.6 volts or higher for stable operation.

The required supply voltage can be estimated by Equation (1).

$$VDD=OUTREF+VGS2+VCS=1\text{ V}+0.4\text{ V}+0.2=1.6 \quad (1)$$

where OUTREF denotes an output voltage of the circuit, which is approximately VBG, VGS2 denotes a gate-source voltage of native transistor Q2, while VCS denotes a voltage drop through current source IBIAS.

It also has a limited output current capability, its maximum useful current is approximately one-half of the value of bias current IBIAS.

Figure 6A:
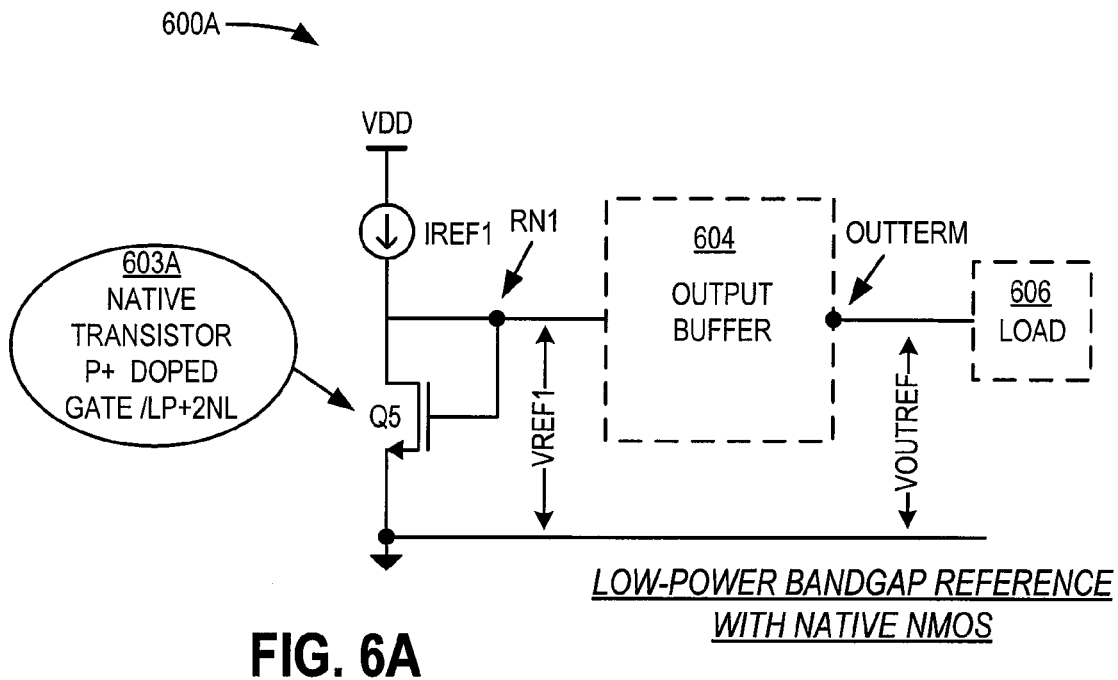
FIG. 6A is a circuit diagram showing a low-power bandgap reference circuit that includes a native NMOS transistor with reference to ground according to embodiments.

FIG. 6A is a circuit diagram that shows a low-power bandgap reference circuit 600A implemented with NMOS transistor Q5. NMOS transistor Q5, according to note 603A, is a native transistor with a gate doped with P+ impurities. Structures and properties of the native transistor are explained in more detail later in this disclosure. NMOS transistor Q5 is configured as a bandgap diode having its drain and gate shorted together to form voltage reference node RN1. Reference node RN1 is coupled to power source VDD via current source IREF1. Reference circuit 600A provides reference voltage VREF1 at the reference node. Reference circuit 600A provides an inexpensive solution for applications representing relatively small loads. An output current is limited to approximately 50% current of IREF1. For more demanding applications output buffer 604 may be added to the circuit to provide more current to load 606 and to enhance the output voltage accuracy and stability.

It should be noted that the using the same design concepts, bandgap reference circuits with similar characteristics can be easily implemented. In one alternative, a native PMOS transistor having a gate doped with N+ impurities is used instead of the native NMOS transistor. In other alternatives, a bandgap reference circuit is implemented with an output voltage referenced to VDD, instead of ground.

Figure 6B:
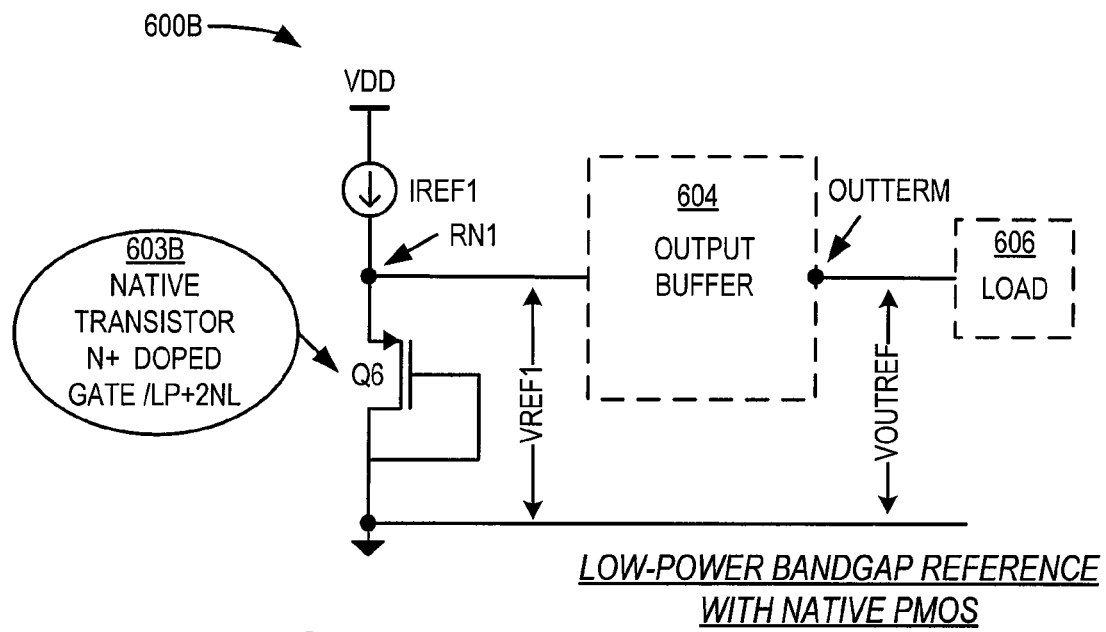
FIG. 6B is a circuit diagram showing a low-power bandgap reference circuit with native PMOS transistor with reference to ground according to an embodiment.

FIG. 6B is a circuit diagram that shows low-power bandgap reference circuit 600B including PMOS transistor Q6. PMOS transistor Q6, according to note 603B, is a native transistor having a gate doped with N+ impurities.

FIG. 6C is a circuit diagram that shows low-power bandgap reference circuit 600C with native NMOS transistor Q5. The gate of PMOS transistor Q5, according to note 603C, is doped with P+ impurities. Bandgap reference circuit 600C provides an output voltage that is referenced to VDD.

FIG. 6D is a circuit diagram that shows low-power bandgap reference circuit 600D with native PMOS transistor Q6. The gate of PMOS transistor Q6 according to note 603D is doped with N+ impurities. Bandgap reference circuit 600D provides an output voltage that is referenced to VDD.

Figure 7:
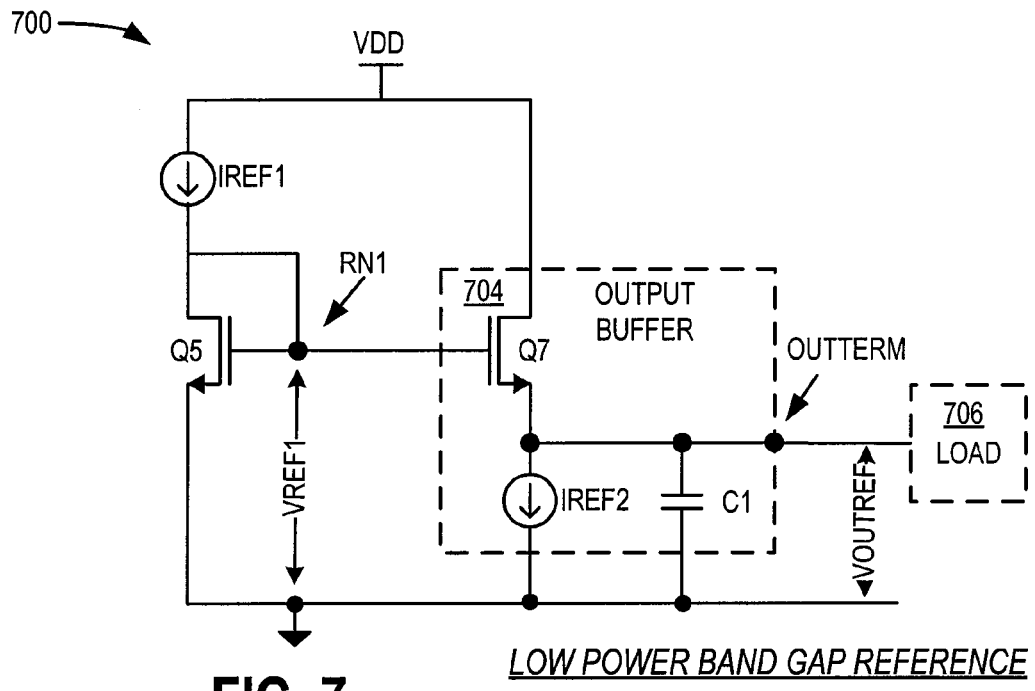
FIG. 7 is a circuit diagram showing a low-power bandgap reference circuit with an output buffer according to embodiments.

FIG. 7 is a circuit diagram showing low-power bandgap reference circuit 700 with output buffer 704. Bandgap reference circuit 700 is a modified version of bandgap reference circuit 600 of FIG. 6. In bandgap reference circuit 700, NMOS transistor Q7 is coupled to reference node RN1 to isolate reference node RN1 from load 706. A drain of NMOS transistor Q7 is coupled to VDD, its gate is coupled to reference node RN1 to receive reference voltage VREF1, and its source is coupled to ground via current sink IREF2. Capacitor C1 is coupled also to the source of NMOS transistor Q7 forming output terminal OUTTERM and providing filtering for output reference voltage VOUTREF. Load 706 is coupled to OUTTERM to receive VOUTREF voltage.

Reference voltage VREF1 at reference node can be estimated by Equation (2).

$$VREF1 = VGS_{NATIVE} + VBG = 1\,V + \sim 0.0\,V = 1.0\,V \quad (2)$$

where VBG denotes a bandgap reference voltage and $VGS_{NATIVE}$ a gate-source voltage of a non-enhanced native transistor Q5. It is noteworthy that VGS of native a transistor is typically between −0.05 and 0.05 V.

Output reference voltage VOUTREF at reference node can be estimated by Equation (3) and Equation (2)

$$VOUTREF = VREF1 - VGS7 \quad (3)$$

$$VOUTREF = VBG + VGS_{NATIVE} - VGS7 = VBG = 1\,V$$

if $VGS_{NATIVE} \approx VGS7$ where VGS7 denotes a gate-source voltage of native transistor Q7. For optimum operation of reference circuit 800 it is desirable to have values for $VGS_{NATIVE}$ and VGS7 to be the same. This goal can be achieved by selecting gate lengths of transistor Q5 and Q7 to be substantially equal and selecting gate widths that assures substantially equal current densities through the transistors.

The required supply voltage can be estimated by Equation (4) or Equation (5)

$$VDD = VGS_{NATIVE} + VBG + VCS1 = 1\,V + 0.2 = 1.2 \quad (4)$$

$$VDD = VOUTREF + VSAT7 = 1\,V + 0.2 = 1.2 \quad (5)$$

where VSAT7 denotes a saturation voltage of native transistor Q7 and VCS1 denotes a voltage drop through current source IREF1.

Figure 8:
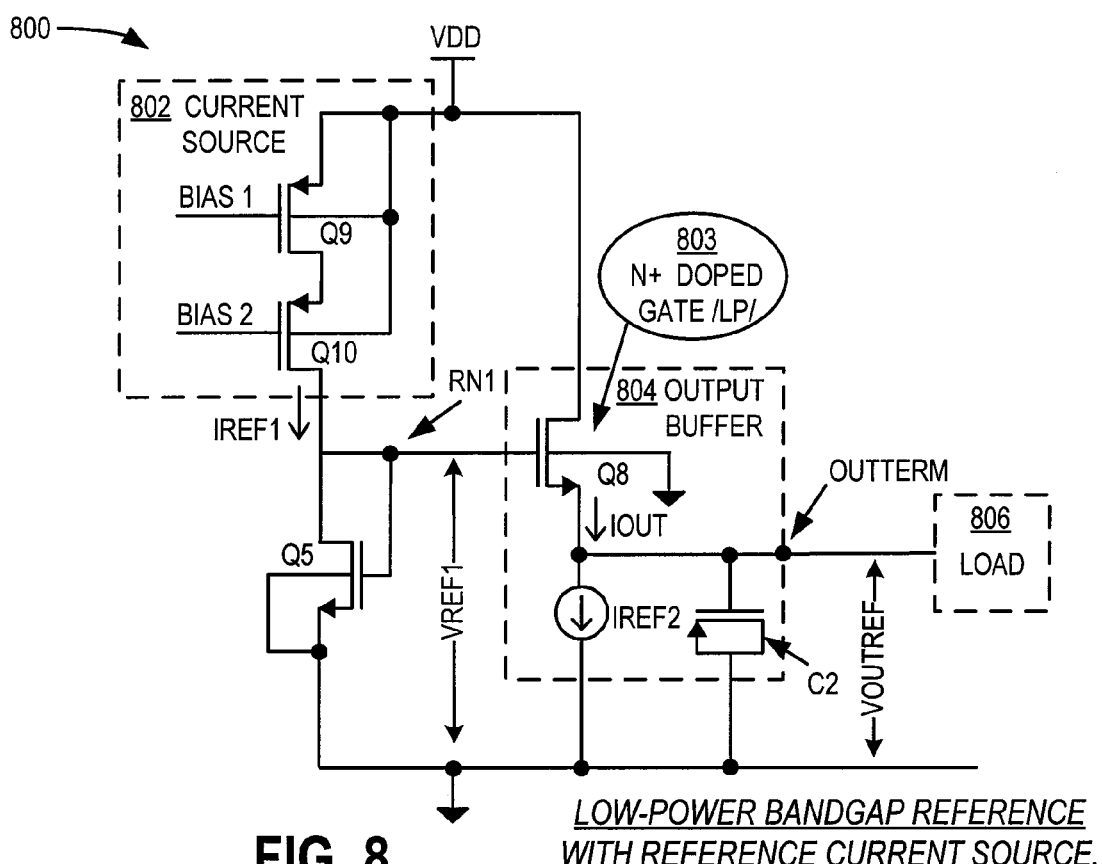
FIG. 8 is a circuit diagram showing a low-power bandgap reference circuit with a reference current source according to an embodiment.

FIG. 8 is a circuit diagram showing low-power bandgap reference circuit 800 with a reference current source 802 and output buffer 804 according to an embodiment. A circuit configuration of reference circuit 800 follows the circuit configuration of reference circuit 700 of FIG. 7.

Output buffer 802 uses native NMOS transistor Q8. A gate length of NMOS transistor Q8, according to note 803, is LP, that is equal to an effective gate length of NMOS transistor Q5.

NMOS transistor Q5 is configured as a bandgap diode having its drain and gate shorted together to form voltage reference node RN1. The source and a substrate of NMOS transistor Q5 is coupled to ground. A voltage on the reference node is VREF1. Reference node RN1 is coupled to power source VDD via current source 802.

Current source 802 may be implemented by two serially coupled PMOS transistors Q9 and Q10, or it can be implemented using a single PMOS transistor. Transistors Q9 and Q10 can be chosen to be the same. A current source implementation using two transistors provides a better supply noise immunity than an implementation with a single transistor. While the implementation with a single transistor permits operation with supply voltage that is a saturation voltage (Vdsat), lower than it is feasible with a two-transistor implementation. Current source 802 provides reference current IREF1. Current of IREF1 may be set to 20 nA.

A gate of NMOS transistor Q8 of the output buffer 802 is coupled to RN1 to receive VREF1, its drain is coupled to supply voltage VDD, its well is coupled to ground, and its source is coupled to ground via current sink IREF2. For optimum operation, current of IREF2 is set to be approximately equal to current of IREF1. The source of NMOS transistor Q8 provides output reference voltage VOUTREF and an output current IOUT to load 806. Capacitor C2 is coupled between the source of NMOS transistor Q8 and ground to provide filtering for output reference voltage VOUTREF. Capacitor C2 may be implemented as a PMOS transistor configured as a capacitor.

A size of a gate width of NMOS transistor Q8 depends on the output current requirement of load 806. The gate width of NMOS transistor Q8 is selected in such a way that a current density through Q8 is substantially equal to a current density through NMOS transistor Q5. For example when current of IOUT is equal to current of IREF1 the gate width of NMOS Q8 is substantially equal to a gate width of NMOS transistor Q5, or when current IOUT is twenty fold of current IREF1 the gate width of transistor Q8 is approximately twenty times larger than the gate width of transistor Q5.

FIG. 9 shows an elevational cross-section 900 of PMOS transistor Q1 of FIG. 5 according to prior art. Transistor Q1 is formed on substrate 901 that includes impurities of P-type. Substrate 901 includes N-well 904 that is doped with impurities of N-type. Gate 907 is disposed over N-well 904 on a top of insulating layer 909 that covers a part of surface region 911. Gate 907 includes different regions doped with P- and N-type impurities. Gate 907 is divided into three regions: two outside regions 910 and one central region 908. Central region of gate 908 is implanted with impurities of N-type. The two outside regions of gate 910 are implanted with impurities of P-type. Two separate regions 905 and 906, on surface region 911 at the edge of gate 908, are implanted with impurities of P-type to form a drain and a source for transistor Q1 respectively.

FIG. 10 shows an exemplary elevational cross-section of a regular native NMOS transistor Q7 of FIG. 7. Transistor Q7 may be formed on substrate 1001 directly, without being in a well. Substrate 1001 is lightly doped with impurities of P-type. Gate 1008 is disposed on top of an insulating layer 1009 that covers a part of surface region 911. Gate 1008 is implanted with impurities of N-type. Two separate regions 1002 and 1003, on surface region 1011 at the edge of gate 1008, are implanted with impurities of N-type to form a drain and a source for transistor Q7 respectively. Dimension L2 represents a gate length of transistor Q7.

FIG. 11 shows an exemplary elevational cross-section of native NMOS transistor Q5 with P+ doped gate of FIGS. 6A, 6C, 7, and 8. Transistor Q5 may be formed on substrate 1101 that includes impurities of P-type. Gate 1107 is disposed on a top of an insulating layer 1109 that covers a part of surface region 1111. Gate 1107 may include different regions doped with P+ and N+ type impurities. Gate 1107 may be divided into three regions, two outside regions 1110 and one central region 1108. Central region of gate 1108 is implanted with impurities of P+ type. The two outside regions 1110 of gate 1107 are implanted with impurities of N+ type. Two separate regions 1102 and 1103, on surface region 1111 at the edge of gate 1107, are implanted with impurities of N+ type to form a drain and a source for transistor Q5 respectively. The two outside regions 1110 of gate 1107 are not necessary for the functioning of transistor Q5, rather they are artifacts of an implantation process forming the drain and source. Dimension L1 represents an effective gate length of transistor Q5.

It is desirable for an optimum operation of the low-power bandgap reference circuits 700 and 800 of FIGS. 7 and 8 to select gate lengths L1 of transistor Q5, and L2 of transistor Q7 of FIG. 10 to be substantially equal.

Figure 12:
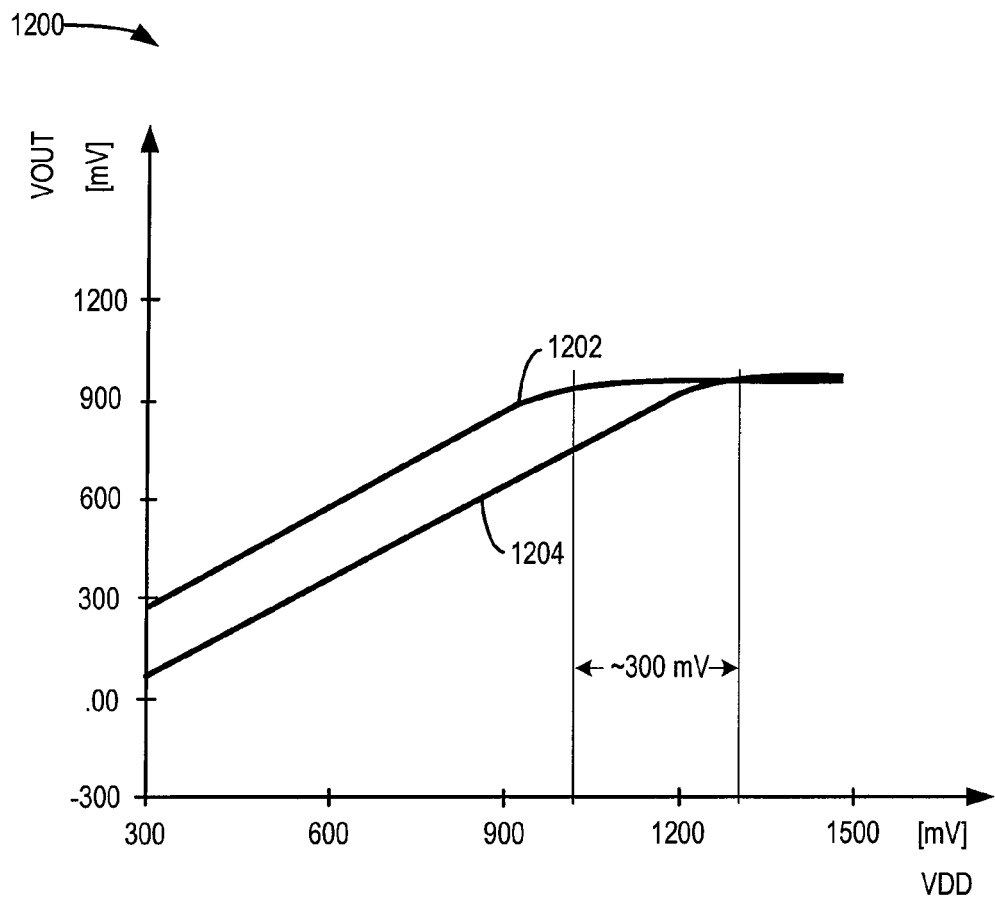
FIG. 12 is a graph showing output voltage versus supply voltage for the reference circuits of FIGS. 5 and 8.

FIG. 12 is a graph 1200 that shows output voltage as function of a supply voltage for the reference circuits 500 and 800 of FIGS. 5 and 8 respectively. In graph 1200 plot 1202 represents simulation result obtained for voltage reference circuit 800, while plot 1204 represents result obtained for CMOS voltage reference circuit 500. It could be observed that voltage reference circuit 800 is able to operate with a supply voltage that is approximately 300 mV lower than the one required by reference circuit 500.

Figure 13:
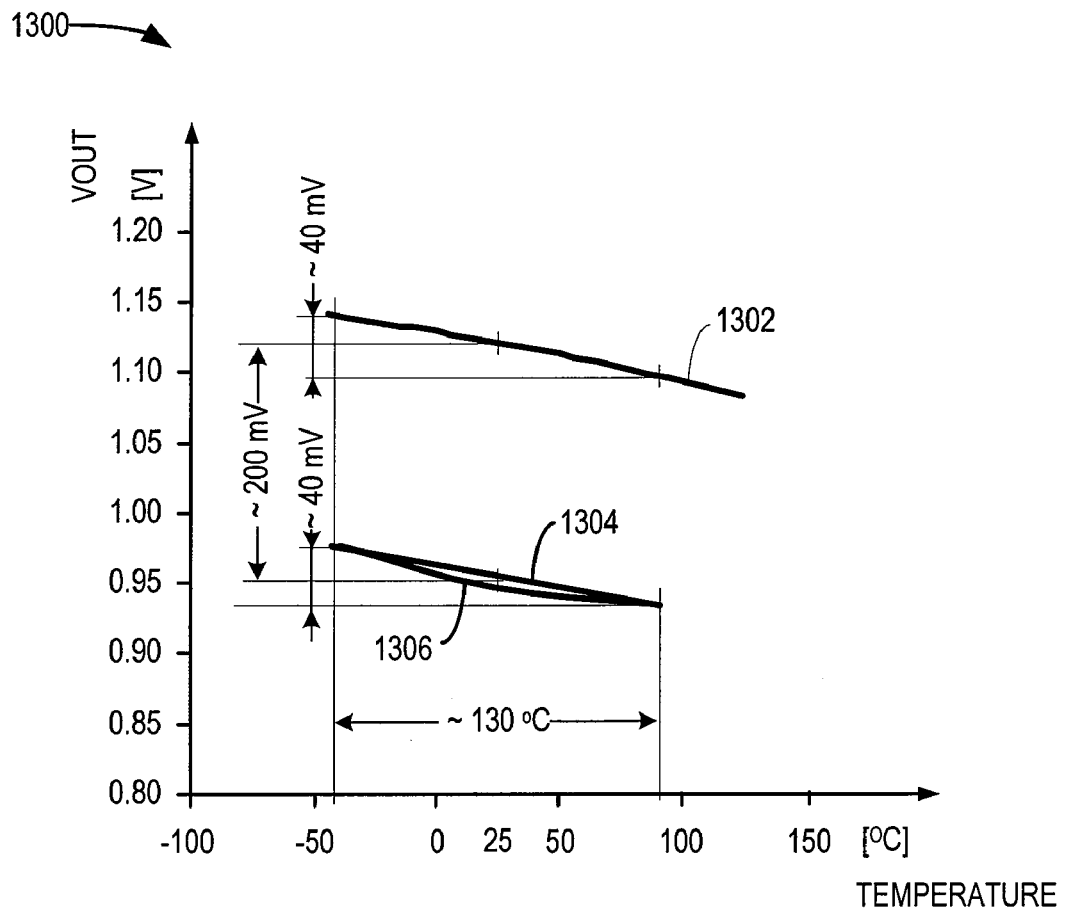
FIG. 13 is a graph showing temperature dependence of an output voltage for the reference circuits of FIG. 8.

FIG. 13 is graph 1300 that shows temperature dependence of an output voltage for reference circuit 800 of FIG. 8. In graph 1300 plot 1302 shows a theoretical behavior of a bandgap device. Plots 1304 and 1306 show behaviors of two representative reference circuits 800 implemented in an IC test vehicle. Both the theoretical device and reference circuit exhibit the same temperature dependent characteristic between −45 and 95 degree Celsius. Both have an approximately 40 mV difference between the two extremes of the temperature range. Theoretical device VBG voltage is approximately 1150 mV at 25 degree Celsius, while output voltage VOUTREF of reference circuit 800 is approximately 200 mV lower. It is noteworthy to observe that device-to-device variation of VOUTREF is less than 2 mV in the worst case.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

What is claimed is:

1. A Radio Frequency Identification (RFID) tag circuit formed in a substrate that is lightly doped with impurities of a first polarity, comprising:
    a first transistor having a first source connected to a ground, a first gate doped with impurities of the first polarity, and a first drain connected to the first gate at a reference node;
    a reference current source to provide a reference current to the reference node for generating a first reference voltage at the reference node; and
    an additional component for receiving the reference voltage.

2. The circuit of claim 1, in which
the reference current value is approximately 20 nA.

3. The circuit of claim 1, in which
the first transistor is formed in the substrate directly, without being in a well.

4. The circuit of claim 1, in which
a well is formed in the substrate, and
the first transistor is formed in the well.

5. The circuit of claim 1, in which
the first gate is doped with impurities of the first polarity only at a central region of the first gate, and the first gate is further doped with impurities of a second polarity opposite to the first polarity, at an edge region of the first gate surrounding the central region.

6. The circuit of claim 1, in which
the reference current source includes a second transistor.

7. The circuit of claim 6, in which
the first transistor has a channel region that is doped with impurities, and
the second transistor has a channel region doped with impurities of a polarity that is opposite to the polarity of the impurities of the channel region of the first transistor.

8. The circuit of claim 6, in which
the reference current source further includes
a third transistor coupled serially with the second transistor.

9. The circuit of claim 8, in which
the second transistor is made substantially identically as the third transistor.

10. The circuit of claim 1, in which
the additional component includes an output buffer to provide an output reference voltage responsive to receiving the first reference voltage.

11. The circuit of claim 10, in which
the output buffer includes a fourth transistor having a fourth gate to receive the first reference voltage, and a fourth source to provide the output reference voltage.

12. The circuit of claim 11, in which
an output current is provided by the fourth source, which is substantially equal to the reference current.

13. The circuit of claim 11, in which
an output current is provided by the fourth source, which is substantially greater than the reference current.

14. The circuit of claim 11, in which
the fourth source is coupled to the ground via a current sink.

15. The circuit of claim 14, in which
the current sink is configured to sink a current that is substantially equal to the reference current.

16. The circuit of claim 11, in which
the fourth source is coupled to the ground via a capacitor.

17. The circuit of claim 16, in which
the capacitor is configured from a transistor.

18. The circuit of claim 11, in which
the fourth gate is doped with impurities of a second polarity opposite to the first polarity.

19. The circuit of claim 11, in which
the fourth transistor is formed in the substrate directly, without being in a well.

20. The circuit of claim 11, in which
a well is formed in the substrate, and
the fourth transistor is formed in the well.

21. The circuit of claim 11, in which
a current density through the first transistor and a current density through the fourth transistor are substantially equal.

22. The circuit of claim 11, in which
the first gate is doped with impurities of the first polarity only at a central region of the first gate, the central region forming an electrically effective gate length of L1, and the first gate is further doped with impurities of a second polarity opposite to the first polarity, at an edge region of the first gate surrounding the central region,
the fourth gate has an electrically effective gate length of L2, and
the gate length of L1 and the gate length of L2 are substantially equal.

23. The circuit of claim 22, in which
the central region forms an electrically effective gate width W1,
the fourth gate has an electrically effective gate width of W2.

24. The circuit of claim 23, in which
the gate width of W1 and the gate width of W2 are substantially equal.

25. The circuit of claim 23, in which
the gate width of W2 is substantially greater than gate width of W1.

26. The circuit of claim 23, in which
the reference current source includes a second transistor and a third transistor coupled serially with the second transistor, the second transistor being made substantially identically as the third transistor.

27. The circuit of claim 1, in which
the additional component is an output buffer to provide an output reference voltage responsive to receiving the first reference voltage, the output buffer including a fourth transistor having a fourth gate to receive the first reference voltage, and a fourth source to provide the output reference voltage and an output current, the fourth source being coupled to the ground via a capacitor and a current sink,
the current sink is configured to sink a current that is substantially equal to the reference current; and
a current density through the first transistor is substantially equal to a current density through the fourth transistor.

28. The circuit of claim 27, in which
the output current being substantially equal to the reference current.

29. The circuit of claim 27, in which
an output current being substantially greater than the reference current.

30. The circuit of claim 27, in which
the first gate is doped with impurities of the first polarity only at a central region of the first gate, the central region forming an electrically effective gate length of L1, and the first gate is further doped with impurities of a second polarity opposite to the first polarity, at an edge region of the first gate surrounding the central region,
the fourth gate has an electrically effective gate length of L2, and
the gate length of L1 and the gate length of L2 are substantially equal.

31. The circuit of claim 30, in which
the central region forms an electrically effective gate width W1, and
the fourth gate has an electrically effective gate width of W2.

32. The circuit of claim 31, in which
the gate width of W1 and the gate width of W2 are substantially equal.

33. The circuit of claim 31, in which
the gate width of W2 is substantially greater than gate width of W1.

\* \* \* \* \*